United States Patent [19]
Igarashi

[11] Patent Number: 5,933,275
[45] Date of Patent: Aug. 3, 1999

[54] OPTICAL SYSTEM FOR NON-FLEXIBLE ENDOSCOPES

[75] Inventor: Tsutomu Igarashi, Hachioji, Japan

[73] Assignee: Olympus Optical Co., Ltd., Tokyo, Japan

[21] Appl. No.: 08/733,916

[22] Filed: Oct. 18, 1996

[30] Foreign Application Priority Data

Oct. 20, 1995 [JP] Japan ................................. 7-295970

[51] Int. Cl.⁶ ...................................................... G02B 9/34
[52] U.S. Cl. ............................................ 359/435; 359/434
[58] Field of Search ................................ 359/362–363,
359/423, 434–435, 663, 753; 600/130, 160,
108, 171, 175, 181; 348/65, 369, 67, 337

[56] References Cited

U.S. PATENT DOCUMENTS

| | | | |
|---|---|---|---|
| 4,025,155 | 5/1977 | Imai | 359/435 |
| 4,300,812 | 11/1981 | Nakahashi | 359/434 |
| 4,575,195 | 3/1986 | Hoogland | 359/435 |
| 4,693,568 | 9/1987 | Takahashi | 359/435 |
| 4,784,118 | 11/1988 | Fantone et al. | 359/435 |
| 5,005,955 | 4/1991 | Ohshita | 359/432 |
| 5,142,410 | 8/1992 | Ono et al. | 359/434 |
| 5,625,488 | 4/1997 | Dietzsch et al. | 359/434 |
| 5,632,718 | 5/1997 | Igarashi et al. | 600/160 |

FOREIGN PATENT DOCUMENTS

| | | | |
|---|---|---|---|
| 2 309 886 | 11/1976 | France | 359/435 |
| 49-05993 | 12/1974 | Japan . | |
| 50-68349 | 6/1975 | Japan . | |
| 521542 | 7/1976 | Russian Federation | 359/435 |

*Primary Examiner*—Thong Nguyen
*Attorney, Agent, or Firm*—Pillsbury Madison & Sutro LLP

[57] ABSTRACT

A relay lens system used in an observation optical system which is to be disposed in an insert section is disclosed. The relay lens system comprises a plurality of relay lens units at least one of which allows longitudinal chromatic aberration to remain in an undercorrected tendency and at least another of which allows longitudinal chromatic aberration to remain in an overcorrected tendency, thereby correcting longitudinal chromatic aberration favorably in the relay lens system as a whole.

18 Claims, 10 Drawing Sheets

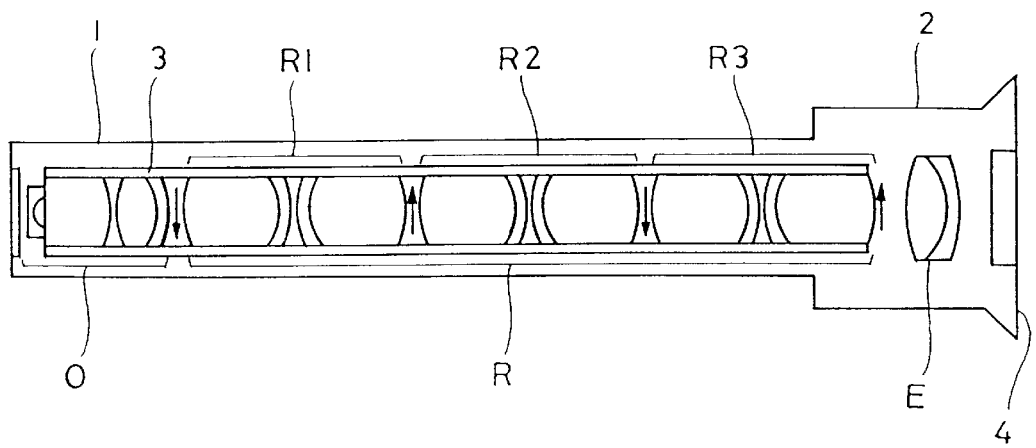

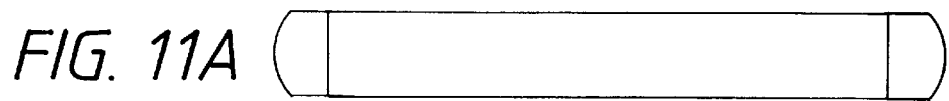
FIG. 11A
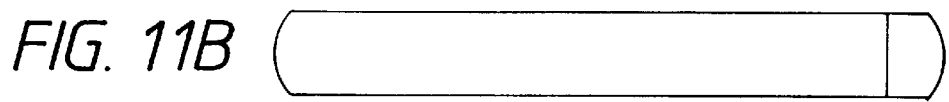
FIG. 11B
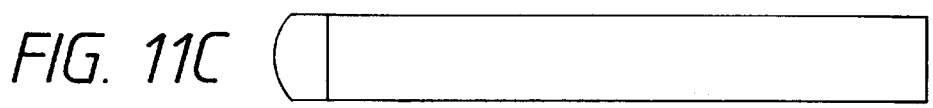
FIG. 11C
FIG. 12A
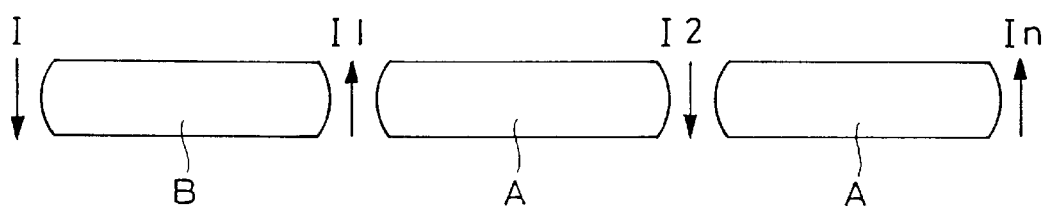
FIG. 12B
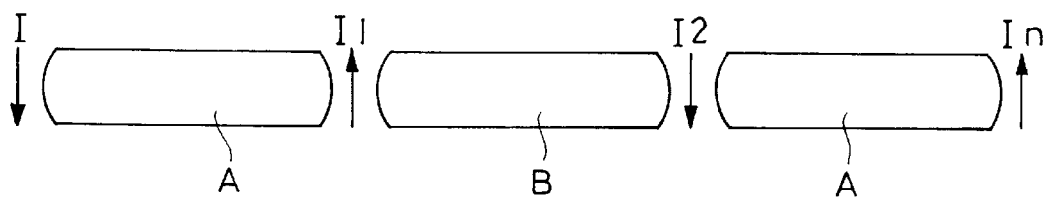
FIG. 12C
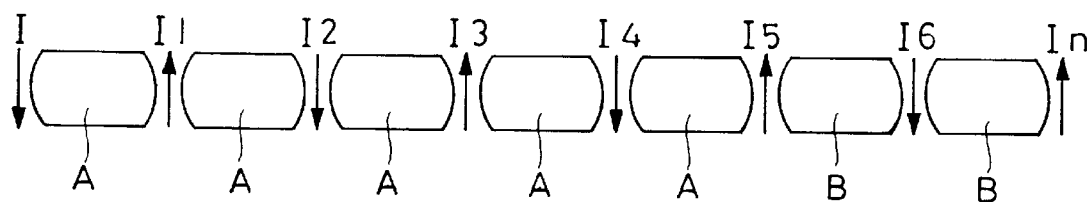

OPTICAL SYSTEM FOR NON-FLEXIBLE ENDOSCOPES

BACKGROUND OF THE INVENTION a) Field of the Invention

The present invention relates to an optical system for non-flexible endoscopes and more specifically a relay lens system for non-flexible endoscopes.

b) Description of the Prior Art

A non-flexible endoscope ordinarily has a composition such as that shown in FIG. 1, consists of a non-flexible insert section 1 which is elongated for insertion into cavities of living bodies or the like, and a grip section 2 which is located outside the cavities and held by an operator's hand or a non-flexible endoscope holder. An observation optical system O which allows observation of an object located in a cavity is disposed so as to extend from the insert section 1 to the grip section 2. A portion of the observation optical system O which is disposed in the insert section 1 consists of an objective lens system disposed on a side of a distal end and serves for forming a real image of an object, and a relay lens system R for relaying the image formed by the objective lens system to a portion of the optical system disposed in the grip section. The objective lens system and the relay lens system are disposed coaxially in an optical system holding tube 3 which is accommodated in the insert section 1. A portion of the optical system disposed in the grip section comprises an eyepiece system E which allows observation of an image of the object which is relayed by the relay lens system. Further, a video camera for non-flexible endoscopes is disposed on an eyepiece mount for allowing observation of the image of the object on a TV monitor since video observation is indispensable for surgical operations with a non-flexible endoscope.

A relay lens system which is to be used with such a non-flexible endoscope or the like is configured to relay an image a plurality of times. A module used for relaying an image for a single cycle distance through the relay lens system will hereinafter be referred to as a relay lens unit R1, R2 or R3.

A lens system disclosed by Japanese Patent Kokoku Publication No. Sho 49-5993 is known as a conventional example of such a relay lens system for non-flexible endoscopes. A conventional relay lens system, such as the conventional example mentioned above, is usually configured to relay an image a plurality of times using a plurality of relay lens units which have the same composition. For minimizing the amounts of aberrations that are produced by the relay lens system as a whole, it is necessary to correct aberrations independently in each of the relay lens units. For this reason, each relay lens unit mostly comprises a negative lens element. In such a case, however, there is posed a problem that the relay lens unit requires a large number of lens elements and has a high manufacturing cost for the relay lens system.

FIGS. 2A, 2B and 2C show conventional examples wherein negative lens elements are used in relay lens units for correcting longitudinal chromatic aberration. FIG. 2A shows the conventional example disclosed by the above-mentioned Japanese Patent Kokoku Publication No. Sho 49-5993 wherein negative lens elements which have a relatively high refractive index and a strong dispersing power are disposed in the middle between two rod-like cemented lens components so that spherical aberration is corrected by cemented surfaces that have a negative power and longitudinal chromatic aberration is corrected by the strong dispersing power of the negative lens elements. This conventional example requires at least four lens elements for composing a relay lens unit, or lens elements numbering as many as 12 for relaying an image three times. When the rod-like lens element of the relay lens unit is divided into thin plano-convex lens elements and a rod-like lens element having planar surfaces on both sides, as shown in FIG. 2B, taking surface eccentricies introduced during manufacturing into consideration, it will be required to use as many as eight lens elements for composing a relay lens unit, thereby stupendously enhancing the manufacturing cost for the relay lens system. Apart from this example, at least four lens elements are required for favorably correcting longitudinal chromatic aberration with a relay lens unit which includes a rod-like lens element.

As an example wherein longitudinal chromatic aberration is not corrected in a relay lens unit, there is known a lens system disclosed by U.S. Pat. No. 4,784,118. This conventional example has a composition shown in FIG. 2C wherein a relay lens unit is composed of lens elements in an extremely small number of 2. However, this conventional example wherein longitudinal chromatic aberration is not corrected in the relay lens unit can hardly correct longitudinal chromatic aberration in the relay lens system as a whole, thereby being incapable of providing good quality images.

As other conventional examples wherein longitudinal chromatic aberration is not corrected in relay lens units, there are known lens systems which use gradient index lens elements. A relay lens system disclosed by Japanese Patent Kokai Publication No. Sho 50-68349, for example, is configured so that longitudinal chromatic aberration produced by a gradient index lens element used in a relay lens unit is cancelled by another relay lens unit disposed on a side of an eyepiece system. However, a relay lens system comprising a gradient index lens element can hardly be manufactured so as to have a small outside diameter and such a relay lens system is unusable with non-flexible endoscopes which have small diameters, or is applicable only within a limited range. For configuring a relay lens system which is usable commonly with a variety of non-flexible endoscopes, it is therefore necessary to use optical elements which are obtained by polishing or shaping homogenous glass materials.

Further, the above-mentioned relay lens unit which is disposed on the side of the eyepiece system cannot be accommodated in the optical system holding tube used in the insert section and makes no contribution at all to extension of an image relaying distance in the insert section. It is therefore desirable that all lens elements used for composing a relay lens system have outside diameters which can be accommodated in the optical system holding tube.

SUMMARY OF THE INVENTION

A primary object of the present invention is to provide a relay optical system for non-flexible endoscopes which has a wide range of application, can be manufactured at a low cost and has longitudinal chromatic aberration favorably corrected in the relay optical system as a whole.

The relay optical system for non-flexible endoscopes according to the present invention comprises an observation optical system which is disposed in an insert section, and composed, in order from a side of a distal end, of an objective lens system and a relay lens system. The relay lens system comprises a plurality of relay lens units, at least one of which allows longitudinal chromatic aberration to remain in an undercorrected tendency and at least another of which allows longitudinal chromatic aberration to remain in an overcorrected tendency, and is configured to correct longitudinal chromatic aberration favorably in the relay lens system as a whole by cancelling the undercorrected longitudinal chromatic aberration and the overcorrected longitudinal chromatic aberration with each other.

Speaking more concretely, the observation optical system of the relay optical system for non-flexible endoscopes according to the present invention which is disposed in the insert section is composed, in order from the side of the distal end, of an objective lens system and a relay lens system. The relay lens system is composed only of optical elements made of homogenous media and comprises a plurality of relay lens units, at least one of which has a composition comprising no negative lens element (composed only of positive lens components and lens components having no refracting power) and allows longitudinal chromatic aberration to remain in an undercorrected tendency, whereas at least another one of which has a composition comprising negative lens elements and allows longitudinal chromatic aberration to remain in an overcorrected tendency, whereby the undercorrected longitudinal chromatic aberration and the overcorrected longitudinal chromatic aberration are cancelled with each other.

In the relay lens system according to the present invention, a simple composition which does not correct longitudinal chromatic aberration is selected for some of the relay lens units for reducing the number of lens elements used for composing the relay lens system and a composition for overcorrecting longitudinal chromatic aberration is selected for the other lens units for correcting longitudinal chromatic aberration favorably in the relay lens system as a whole. In addition, the relay lens system according to the present invention is configured on assumptions that it is applied to non-flexible endoscopes having all specifications, that it is composed only of optical elements made of homogenous media and that all lens elements of the relay lens system are to be accommodated in an optical system holding tube.

BRIEF DESCRIPTION OF THE DRAWINGS

FIG. 1 shows a sectional view illustrating a fundamental composition of an observation optical system for non-flexible endoscopes;

FIGS. 2A, 2B and 2C show sectional views illustrating compositions of conventional relay lens units;

FIGS. 11A, 11B and 11C show sectional views illustrating compositions of rod-like lens components which are to be used in the relay lens system according to the present invention; and FIGS. 12A, 12B and 12C show sectional views exemplifying arrangements of the relay lens units in the relay lens system according to the present invention.

DETAILED DESCRIPTION OF THE PREFERRED EMBODIMENTS

Figure 3:
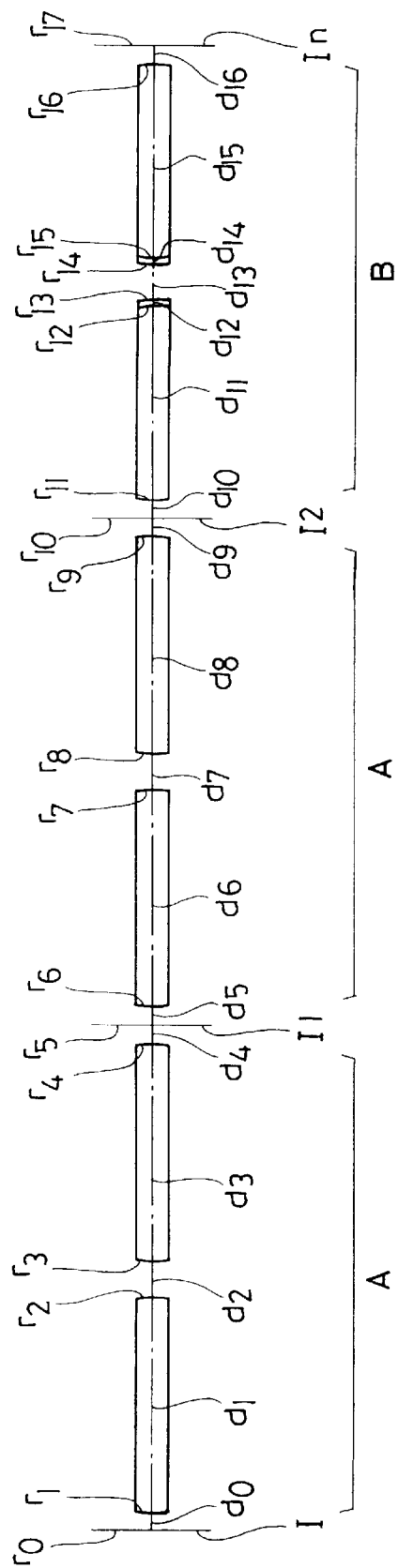
FIGS. 3 through 9 show sectional views illustrating compositions of first through seventh embodiments of the relay lens system according to the present invention.

FIG. 3 shows a sectional view illustrating a composition of a first embodiment of the relay lens system of the optical system for non-flexible endoscopes. The relay lens system is composed, in order from the object side (or from a side of an image of an object I formed by an objective lens system which is not shown but located on the left side in the drawing) of a relay lens unit A which forms a primary image $I_1$ by relaying the image of the object I, a relay lens unit A which formes a secondary image $I_2$ by relaying the primary image $I_1$ and a relay lens unit B which forms a final image $I_n$ by relaying the secondary image $I_2$.

The relay lens system preferred as the first embodiment shown in FIG. 3 has numerical data which is listed below:

First Embodiment $r_0 = \infty$
$\quad d_0 = 4.0000$
$r_1 = 22.8851$
$\quad d_1 = 48.0000 \quad n_1 = 1.69680 \quad v_1 = 55.53$
$r_2 = -22.8851$
$\quad d_2 = 8.0000$
$r_3 = 22.8851$
$\quad d_3 = 48.0000 \quad n_2 = 1.69680 \quad v_2 = 55.53$
$r_4 = -22.8851$
$\quad d_4 = 4.0000$
$r_5 = \infty$
$\quad d_5 = 4.0000$
$r_6 = 22.8851$
$\quad d_6 = 48.0000 \quad n_3 = 1.69680 \quad v_3 = 55.53$
$r_7 = -22.8851$
$\quad d_7 = 8.0000$
$r_8 = 22.8851$
$\quad d_8 = 48.0000 \quad n_4 = 1.69680 \quad v_4 = 55.53$
$r_9 = -22.8851$
$\quad d_9 = 4.0000$
$r_{10} = \infty$
$\quad d_{10} = 4.0000$
$r_{11} = 20.5000$
$\quad d_{11} = 43.3080 \quad n_5 = 1.65160 \quad v_5 = 58.52$
$r_{12} = -7.6466$
$\quad d_{12} = 1.0000 \quad n_6 = 1.78472 \quad v_6 = 25.71$
$r_{13} = -16.1743$
$\quad d_{13} = 8.0000$
$r_{14} = 16.1743$
$\quad d_{14} = 1.0000 \quad n_7 = 1.78472 \quad v_7 = 25.71$
$r_{15} = 7.6466$
$\quad d_{15} = 43.3080 \quad n_8 = 1.65160 \quad v_8 = 58.52$
$r_{16} = -20.5000$
$\quad d_{16} = 4.0000$
$r_{17} = \infty$
paraxial lateral magnification −1,
image height (mm) 2.18, NA 0.101,
effective diameter of lens system (mm) 5.8,
total length (mm) (from object to be observed to final image) 328.62, entrance pupil ∞, exit pupil ∞ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's numbers of the respective lens elements. Further, the reference symbol $r_0$ designates an image of an object formed by an objective lens system and the reference symbol $d_0$ denotes a distance as measured from the image of the object I to the first surface $r_1$ of the relay lens system.

Two relay lens units A disposed in the relay lens system preferred as the first embodiment shown in FIG. 3 have the same composition, or are composed of two biconvex rod-like lens components of four lens elements (lens element $r_1 \sim r_2$, lens element $r_3 \sim r_4$, lens element $r_6 \sim r_7$ and lens element $r_8 \sim r_9$) which are disposed symmetrically with regard to a center and comprises no negative lens element (consists only of positive lens elements). In the relay lens units A, all convex surfaces have the same radius of curvature. Further, relay lens unit B is composed of two biconvex cemented doublets (lens component $r_{11} \sim r_{13}$ and lens component $r_{14} \sim r_{16}$) which are disposed symmetrically with regard to a center. The relay lens unit B comprises negative lens elements. Speaking concretely, the two biconvex lens components are composed of two biconvex lens elements (lens element $r_{11} \sim r_{12}$ and lens element $r_{15} \sim r_{16}$) and negative meniscus lens elements (lens element $r_{12} \sim r_{13}$ and lens element $r_{14} \sim r_{15}$) which are cemented to the rod-like lens elements on the side of the center.

In the relay lens unit B, the meniscus lens elements have a refractive index higher than that of the biconvex rod-like lens elements and a dispersing power stronger than that of the biconvex rod-like lens elements.

The relay lens system as a whole preferred as the first embodiment comprises eight lens elements, or is composed of a small number lens elements for a relay lens system for relaying an image three times. This merit is obtained owing to the fact that the relay lens system uses two relay lens units A which comprises no negative lens element and share no burden for correction of longitudinal chromatic aberration.

Description will be made of correction of longitudinal chromatic aberration in the first embodiment. For longitudinal chromatic aberration listed in the following numerical data of the first embodiment, the d line was taken as the standard:

|  | C-line | F-line |
|---|---|---|
| In relay lens unit A | 0.1,86 | −0.417 |
| In relay lens unit B | −0.275 | 0.787 |
| In relay lens system as a whole | 0.097 | −0.047 |
| In three relay lens units A | 0.558 | −1.252 |

In the first embodiment, the relay lens unit A, which comprises no negative lens element functioning to correct longitudinal chromatic aberration, tends to undercorrect longitudinal chromatic aberration. The relay lens unit B allows longitudinal chromatic aberration to remain in an amount nearly twice as large as that allowed to remain by the relay lens unit A. Accordingly, longitudinal chromatic aberration produced by the two relay lens units A is cancelled by longitudinal chromatic aberration produced in an opposite direction by the relay lens unit B. Accordingly, longitudinal chromatic aberration is corrected favorably in the relay lens system as a whole preferred as the first embodiment. Each of the values mentioned on the undermost line in the numerical data listed above represents longitudinal chromatic aberration that is produced in a relay lens system composed of three relay lens units A. Such a relay lens system composed only of the relay lens units A will produce remarkable longitudinal chromatic aberration and be unusable in practice.

In the first embodiment, spherical aberration is also cancelled by combining the relay lens units A with the relay lens unit B for cancellation. The relay lens units A, which have no refracting surface for correcting spherical aberration in an opposite direction, produces spherical aberration in an undercorrected tendency. In contrast, the relay lens unit B which has the cemented surfaces in the vicinities of the center produces spherical aberration in an overcorrected tendency. Accordingly, spherical aberration is favorably corrected by cancelling spherical aberration produced by the two relay lens units A with spherical aberration produced by the relay lens unit B. Also in other embodiments which are described subsequently, spherical aberration is also cancelled.

Though the relay lens units A allow aberration to remain in the relay lens system according to the present invention as described above, it is desirable, for lessening the burden imposed on the relay lens unit B for aberration corrections, to configure the relay lens units A so as to allow aberrations to remain in smaller amounts. For this reason, it is desirable to select a glass material which has a high refractive index and a weak dispersing power for the two biconvex lens elements to be used as the relay lens unit A. The first embodiment is configured on an assumption that the biconvex rod-like lens elements are to be made of a lanthanum crown glass material.

In FIG. 3, and the numerical data of the embodiment, the reference symbols $r_5$, $r_{10}$ and $r_{17}$ represent a primary image $I_1$, a secondary image $I_2$ and a final image $I_n$, respectively.

Figure 10:
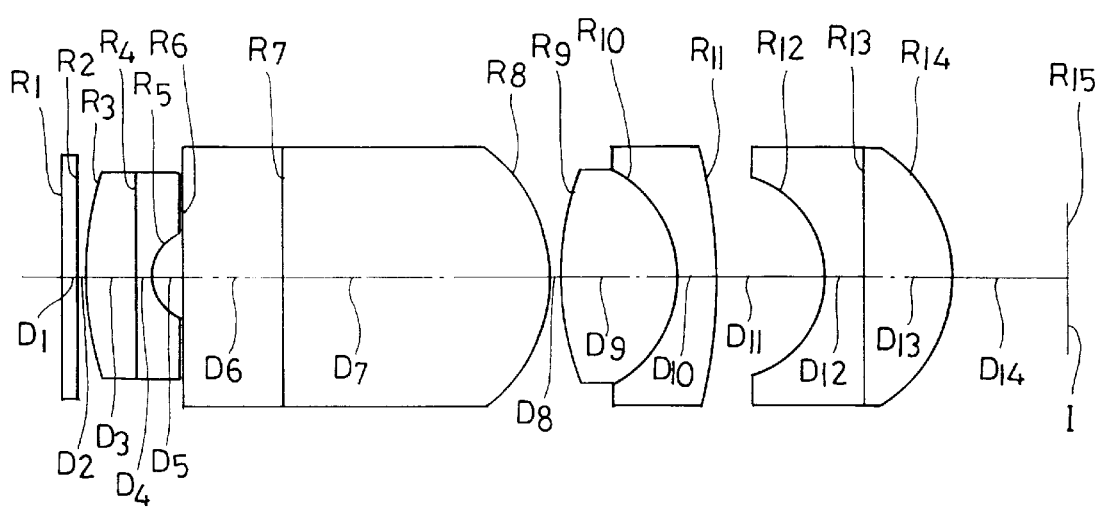
FIG. 10 shows a sectional view illustrating a composition of an optical system wherein the first embodiment of the present invention is combined with an objective lens system.

A combination of the relay lens system preferred as the first embodiment and an objective lens system will now be described. This objective lens system has a composition illustrated in FIG. 10, and numerical data listed below:

$R_0 = \infty$
$\quad D_0 = 30.0000$
$R_1 = \infty$
$\quad D_1 = 0.4000 \quad N_1 = 1.76900 \quad V_1 = 64.15$
$R_2 = \infty$
$\quad D_2 = 0.2000$
$R_3 = 16.5652$ (aspherical surface)
$\quad D_3 = 1.3000 \quad N_2 = 1.78472 \quad V_2 = 25.71$
$R_4 = \infty$
$\quad D_4 = 0.4000 \quad N_3 = 1.58144 \quad V_3 = 40.75$
$R_5 = 1.2000$
$\quad D_5 = 0.8000$
$R_6 = \infty$
$\quad D_6 = 2.5637 \quad N_4 = 1.80610 \quad V_4 = 40.95$
$R_7 = \infty$
$\quad D_7 = 6.7963 \quad N_5 = 1.80610 \quad V_5 = 40.95$
$R_8 = -4.3210$
$\quad D_8 = 0.3000$
$R_9 = 8.2920$
$\quad D_9 = 3.0000 \quad N_6 = 1.60311 \quad V_6 = 60.70$
$R_{10} = -3.1560$
$\quad D_{10} = 1.0000 \quad N_7 = 1.84666 \quad V_7 = 23.89$
$R_{11} = -13.8440$
$\quad D_{11} = 2.8300$
$R_{12} = -2.7200$
$\quad D_{12} = 1.0000 \quad N_8 = 1.58144 \quad V_8 = 40.75$
$R_{13} = \infty$
$\quad D_{13} = 2.3000 \quad N_9 = 1.60311 \quad V_9 = 60.70$
$R_{14} = -3.9830$
$\quad D_{14} = 2.9700$
$R_{15} = \infty$
aspherical surface coefficients
$A_4 = 5.8044 \times 10^{-3}$, $A_6 = -3.7284 \times 10^{-4}$
image height 2.18 mm, F number 4.967,
field angle 67.28°, exit pupil $\infty$ wherein the reference symbols $R_1, R_2, \ldots$ represent radii of curvature on surfaces of respective lens elements, the reference symbols $D_1, D_2, \ldots$ designate thicknesses of the respective lens elements and air-spaces reserved therebetween, the reference symbols $N_1, N_2, \ldots$ denote refractive indices of the respective lens elements, and the reference symbols $V_1, V_2, \ldots$ represent Abbe's numbers of the respective lens elements. Further, the reference symbol $R_0$ designates an object point, the reference symbol $D_0$ denotes a distance as measured from the object point to a first surface of the objective lens system and the reference symbol $R_{15}$ represents a location of an image of an object formed by the objective lens system.

The surface $R_3$ of the objective lens system is configured as an aspherical surface which has a shape expressed by the following formula:

$$x = \frac{y/R}{1 + \sqrt{1-(y/R)^2}} + A_4 y^4 + A_6 y^6$$

wherein a direction along an optical axis is taken as the x axis, a direction perpendicular to the optical axis is taken as the y axis, the reference symbol R represents a radius of curvature on a reference sphere of the aspherical surface, and the reference symbols $A_4$ and $A_6$ designate aspherical surface coefficients.

In the relay lens system preferred as the first embodiment, longitudinal chromatic aberration and spherical aberration are corrected favorably, but curvature of field and astigmatism are not corrected sufficiently, or remain in an under-corrected tendency. For this reason, the objective lens system produces curvature of field and astigmatism in an over-corrected tendency for correcting curvature of field and astigmatism favorably in the combination optical system as a whole.

Now, description will be made of second through seventh embodiments.

The second through seventh embodiments have compositions illustrated in FIGS. 4 through 9 respectively and numerical data listed below:

Second Embodiment $r_1 = \infty$
  $d_0 = 4.0000$
$r_1 = 22.8851$
  $d_1 = 48.0000$  $n_1 = 1.69680$  $v_1 = 55.53$
$r_2 = -22.8851$
  $d_2 = 8.0000$
$r_3 = 22.8851$
  $d_3 = 48.0000$  $n_2 = 1.69680$  $v_2 = 55.53$
$r_4 = -22.8851$
  $d_4 = 4.0000$
$r_5 = \infty$
  $d_5 = 4.0000$
$r_6 = 22.6851$
  $d_6 = 48.0000$  $n_3 = 1.69680$  $v_3 = 55.53$
$r_7 = -22.8851$
  $d_7 = 8.0000$
$r_8 = 22.8851$
  $d_8 = 48.0000$  $n_4 = 1.69680$  $v_4 = 55.53$
$r_9 = -22.8851$
  $d_9 = 4.0000$
$r_{10} = \infty$
  $d_{10} = 4.0000$
$r_{11} = 10.3460$
  $d_{11} = 2.0000$  $n_5 = 1.88300$  $v = 40.78$
$r_{12} = 4.3021$
  $d_{12} = 42.0000$  $n_6 = 1.65160$  $v_6 = 58.52$
$r_{13} = -7.5577$
  $d_{13} = 1.0000$  $n_7 = 1.75520$  $v_7 = 27.51$
$r_{14} = -16.7052$
  $d_{14} = 1.0000$
$r_{15} = 16.7052$
  $d_{15} = 1.0000$  $n_8 = 1.75520$  $v_8 = 27.51$
$r_{16} = 7.5577$
  $d_{16} = 42.0000$  $n_9 = 1.65160$  $v_9 = 58.52$
$r_{17} = -4.3021$
  $d_{17} = 2.0000$  $n_{10} = 1.88300$  $v_{10} = 40.78$
$r_{18} = -10.3460$
  $d_{18} = 4.0000$
$r_{19} = \infty$ Second Embodiment paraxial lateral magnification −1, image height 2.18,
NA 0.101, effective diameter of lens system 5.8,
total length 323, entrance pupil ∞, exit pupil ∞

Third Embodiment $r_0 = \infty$
  $d_0 = 4.0000$
$r_1 = 22.8851$
  $d_1 = 48.0000$  $n_1 = 1.69680$  $v_1 = 55.53$
$r_2 = -22.8851$
  $d_2 = 8.0000$
$r_3 = 22.8851$
  $d_3 = 48.0000$  $n_2 = 1.69680$  $v_2 = 55.53$
$r_4 = -22.8851$
  $d_4 = 4.0000$
$r_5 = \infty$
  $d_5 = 4.0000$
$r_6 = 22.8851$
  $d_6 = 48.0000$  $n_3 = 1.69680$  $v_3 = 55.53$
$r_7 = -22.8851$
  $d_7 = 8.0000$
$r_8 = 22.8851$
  $d_8 = 48.0000$  $n_4 = 1.69680$  $v_4\ 55.53$
$r_9 = -22.8851$
  $d_9 = 4.0000$
$r_{10} = \infty$
  $d_{10} = 4.0000$
$r_{11} = 43.6995$
  $d_{11} = 5.0000$  $n_5 = 1.88300$  $v_5 = 40.78$
$r_{12} = -6.5907$
  $d_{12} = 1.0000$
$r_{13} = -4.8021$
  $d_{13} = 2.0000$  $n_6 = 1.69895$  $v_6 = 30.12$
$r_{14} = \infty$
  $d_{14} = 32.0000$  $n_7 = 1.58913$  $v_7 = 61.18$
$r_{15} = -7.4230$
  $d_{15} = 1.0000$  $n_8 = 1.78472$  $v_8 = 25.71$
$r_{16} = -13.0310$
  $d_{16} = 1.0000$
$r_{17} = 13.0310$
  $d_{17} = 1.0000$  $n_9 = 1.78472$  $v_9 = 25.71$
$r_{18} = 7.4230$
  $d_{18}\ 32.0000$  $n_{10} = 1.58913$  $v_{10} = 61.18$
$r_{19} = \infty$
  $d_{19} = 2.0000$  $n_{11} = 1.69895$  $v_{11} = 30.12$
$r_{20} = 4.8021$
  $d_{20} = 1.0000$
$r_{21} = 6.5907$
  $d_{21} = 5.0000$  $n_{12} = 1.88300$  $v_{12} = 40.78$
$r_{22} = -43.5996$
  $d_{22} = 4.0000$
$r_{23} = \infty$ paraxial lateral magnification −1, image height 2.18,
NA 0.1, effective diameter of lens system 5.8,
total length 315, entrance pupil ∞, exit pupil ∞

Fourth Embodiment $r_0 = \infty$
  $d_0 = 4.0000$
$r_1 = 18.9290$
  $d_1 = 43.7000$  $n_1 = 1.62004$  $v_1 = 30.26$
$r_2 = \infty$
  $d_2 = 2.6570$
$r_3 = 30.2291$
  $d_3 = 3.0000$  $n_2 = 1.88300$  $v_2 = 40.78$
$r_4 = -30.2291$
  $d_4 = 2.6570$
$r_5 = \infty$
  $d_5 = 43.7000$  $n_3 = 1.62004$  $v_3 = 36.26$

Fourth Embodiment (continued)

| | | | |
|---|---|---|---|
| $r_6 = -18.9290$ | | | |
| | $d_6 = 4.0000$ | | |
| $r_7 = \infty$ | | | |
| | $d_7 = 4.0000$ | | |
| $r_8 = 18.9290$ | | | |
| | $d_8 = 43.7000$ | $n_4 = 1.62004$ | $\nu_4 = 36.26$ |
| $r_9 = \infty$ | | | |
| | $d_9 = 2.6570$ | | |
| $r_{10} = 30.2291$ | | | |
| | $d_{10} = 3.0000$ | $n_5 = 1.88300$ | $\nu_5 = 40.78$ |
| $r_{11} = -30.2291$ | | | |
| | $d_{11} = 2.6570$ | | |
| $r_{12} = \infty$ | | | |
| | $d_{12} = 43.7000$ | $n_6 = 1.62004$ | $\nu_6 = 36.26$ |
| $r_{13} = -18.9290$ | | | |
| | $d_{13} = 4.0000$ | | |
| $r_{14} = \infty$ | | | |
| | $d_{14} = 4.0000$ | | |
| $r_{15} = 18.9290$ | | | |
| | $d_{15} = 43.7000$ | $n_7 = 1.62004$ | $\nu_7 = 36.26$ |
| $r_{16} = \infty$ | | | |
| | $d_{16} = 2.0000$ | $n_8 = 1.56384$ | $\nu_8 = 60.70$ |
| $r_{17} = -6.3560$ | | | |
| | $d_{17} = 1.0000$ | $n_9 = 1.76182$ | $\nu_9 = 26.55$ |
| $r_{18} = -12.8029$ | | | |
| | $d_{18} = 3.2357$ | | |
| $r_{19} = 12.8029$ | | | |
| | $d_{19} = 1.0000$ | $n_{10} = 1.76182$ | $\nu_{10} = 26.55$ |
| $r_{20} = 6.3560$ | | | |
| | $d_{20} = 2.0000$ | $n_{11} = 1.56384$ | $\nu_{11} = 60.70$ |
| $r_{21} = \infty$ | | | |
| | $d_{21} = 43.7000$ | $n_{12} = 1.62004$ | $\nu_{12} = 36.26$ |
| $r_{22} = -18.9290$ | | | |
| | $d_{22} = 4.0000$ | | |
| $r_{23} = \infty$ | | | | paraxial lateral magnification −1, image height 2.18, NA 0.097, effective diameter of lens system 5.8, total length 312.06, entrance pupil ∞, exit pupil ∞

Fifth Embodiment

| | | | |
|---|---|---|---|
| $r_0 = \infty$ | | | |
| | $d_0 = 4.0000$ | | |
| $r_1 = 21.3588$ | | | |
| | $d_1 = 48.0000$ | $n_1 = 1.69680$ | $\nu_1 = 55.53$ |
| $r_2 = -30.0463$ | | | |
| | $d_2 = 1.0000$ | | |
| $r_3 = 97.2779$ | | | |
| | $d_3 = 4.0000$ | $n_2 = 1.69680$ | $\nu_2 = 55.53$ |
| $r_4 = -97.2779$ | | | |
| | $d_4 = 1.0000$ | | |
| $r_5 = 30.0463$ | | | |
| | $d_5 = 48.0000$ | $n_3 = 1.69680$ | $\nu_3 = 55.53$ |
| $r_6 = -21.3588$ | | | |
| | $d_6 = 4.0000$ | | |
| $r_7 = \infty$ | | | |
| | $d_7 = 4.0000$ | | |
| $r_8 = 21.3588$ | | | |
| | $d_8 = 48.0000$ | $n_4 = 1.69680$ | $\nu_4 = 55.53$ |
| $r_9 = -30.0463$ | | | |
| | $d_9 = 1.0000$ | | |
| $r_{10} = 97.2779$ | | | |
| | $d_{10} = 4.0000$ | $n_5 = 1.69680$ | $\nu_5 = 55.53$ |
| $r_{11} = -97.2779$ | | | |
| | $d_{11} = 1.0000$ | | |
| $r_{12} = 30.0463$ | | | |
| | $d_{12} = 48.0000$ | $n_6 = 1.69680$ | $\nu_6 = 55.53$ |
| $r_{13} = -21.3588$ | | | |
| | $d_{13} = 4.0000$ | | |
| $r_{14} = \infty$ | | | |
| | $d_{14} = 4.0000$ | | |
| $r_{15} = 20.5000$ | | | |
| | $d_{15} = 48.0239$ | $n_7 = 1.69680$ | $\nu_7 = 55.53$ |
| $r_{16} = -8.6889$ | | | |
| | $d_{16} = 1.0000$ | $n_8 = 1.78472$ | $\nu_8 = 25.71$ |

Fifth Embodiment (continued)

| | | | |
|---|---|---|---|
| $r_{17} = -19.8229$ | | | |
| | $d_{17} = 1.0000$ | | |
| $r_{18} = 19.8229$ | | | |
| | $d_{18} = 1.0000$ | $n_9 = 1.78472$ | $\nu_9 = 25.71$ |
| $r_{19} = 8.6889$ | | | |
| | $d_{19} = 48.0239$ | $n_{10} = 1.69680$ | $\nu_{10} = 55.53$ |
| $r_{20} = -20.5000$ | | | |
| | $d_{20} = 4.0000$ | | |
| $r_{21} = \infty$ | | | | paraxial lateral magnification −1, image height 2.18, NA 0.1, effective diameter of lens system 5.8, total length 327.05, entrance pupil ∞, exit pupil ∞

Sixth Embodiment

| | | | |
|---|---|---|---|
| $r_0 = \infty$ | | | |
| | $d_0 = 2.0000$ | | |
| $r_1 = 11.9420$ | | | |
| | $d_1 = 26.0100$ | $n_1 = 1.62004$ | $\nu_1 = 36.26$ |
| $r_2 = \infty$ | | | |
| | $d_2 = 2.3343$ | | |
| $r_3 = 18.2085$ | | | |
| | $d_3 = 3.0000$ | $n_2 = 1.88300$ | $\nu_2 = 40.78$ |
| $r_4 = -18.2085$ | | | |
| | $d_4 = 2.3343$ | | |
| $r_5 = \infty$ | | | |
| | $d_5 = 26.0100$ | $n_3 = 1.62004$ | $\nu_3 = 36.26$ |
| $r_6 = -11.9420$ | | | |
| | $d_6 = 2.0000$ | | |
| $r_7 = \infty$ | | | |
| | $d_7 = 2.0000$ | | |
| $r_8 = 11.9420$ | | | |
| | $d_8 = 26.0100$ | $n_4 = 1.62004$ | $\nu_4 = 36.26$ |
| $r_9 = \infty$ | | | |
| | $d_9 = 2.3343$ | | |
| $r_{10} = 18.2085$ | | | |
| | $d_{10} = 3.0000$ | $n_5 = 1.88300$ | $\nu_5 = 40.78$ |
| $r_{11} = -18.2085$ | | | |
| | $d_{11} = 2.3343$ | | |
| $r_{12} = \infty$ | | | |
| | $d_{12} = 26.0100$ | $n_6 = 1.62004$ | $\nu_6 = 36.26$ |
| $r_{13} = -11.9420$ | | | |
| | $d_{13} = 2.0000$ | | |
| $r_{14} = \infty$ | | | |
| | $d_{14} = 2.0000$ | | |
| $r_{15} = 11.9420$ | | | |
| | $d_{15} = 26.0100$ | $n_7 = 1.62004$ | $\nu_7 = 36.26$ |
| $r_{16} = \infty$ | | | |
| | $d_{16} = 2.3343$ | | |
| $r_{17} = 18.2085$ | | | |
| | $d_{17} = 3.0000$ | $n_8 = 1.88300$ | $\nu_8 = 40.78$ |
| $r_{18} = -18.2085$ | | | |
| | $d_{18} = 2.3343$ | | |
| $r_{19} = \infty$ | | | |
| | $d_{19} = 26.0100$ | $n_9 = 1.62004$ | $\nu_9 = 36.26$ |
| $r_{20} = -11.9420$ | | | |
| | $d_{20} = 2.0000$ | | |
| $r_{21} = \infty$ | | | |
| | $d_{21} = 2.0000$ | | |
| $r_{22} = 11.9420$ | | | |
| | $d_{22} = 26.0100$ | $n_{10} = 1.62004$ | $\nu_{10} = 36.26$ |
| $r_{23} = \infty$ | | | |
| | $d_{23} = 2.3343$ | | |
| $r_{24} = 18.2085$ | | | |
| | $d_{24} = 3.0000$ | $n_{11} = 1.88300$ | $\nu_{11} = 40.78$ |
| $r_{25} = -18.2085$ | | | |
| | $d_{25} = 2.3343$ | | |
| $r_{26} = \infty$ | | | |
| | $d_{26} = 26.0100$ | $n_{12} = 1.62004$ | $\nu_{12} = 36.26$ |
| $r_{27} = -11.9420$ | | | |
| | $d_{27} = 2.0000$ | | |
| $r_{28} = \infty$ | | | |
| | $d_{28} = 2.0000$ | | |
| $r_{29} = 11.9420$ | | | |
| | $d_{29} = 26.0100$ | $n_{13} = 1.62004$ | $\nu_{13} = 36.26$ |

-continued

Sixth Embodiment $r_{30} = \infty$
$\quad d_{30} = 2.5000 \quad n_{14} = 1.69680 \quad \nu_{14} = 55.53$
$r_{31} = -3.0905$
$\quad d_{31} = 1.0000 \quad n_{16} = 1.80518 \quad \nu_{16} = 25.43$
$r_{32} = -9.8439$
$\quad d_{32} = 2.2576$
$r_{33} = 9.8439$
$\quad d_{33} = 1.0000 \quad n_{17} = 1.80518 \quad \nu_{17} = 25.43$
$r_{34} = 3.0905$
$\quad d_{34} = 2.5000 \quad n_{18} = 1.69680 \quad \nu_{18} = 55.53$
$r_{35} = \infty$
$\quad d_{35} = 26.0100 \quad n_{19} = 1.62004 \quad \nu_{19} = 36.26$
$r_{36} = -11.9420$
$\quad d_{36} = 2.0000$
$r_{37} = \infty$ paraxial lateral magnification −1, image height 1.23, NA 0.083, effective diameter of lens system 3.1, total length 320.03, entrance pupil ∞, exit pupil ∞

Seventh Embodiment $r_0 = \infty$
$\quad d_0 = 4.0000$
$r_1 = 51.1053$
$\quad d_1 = 3.0000 \quad n_1 = 1.88300 \quad \nu_1 = 40.78$
$r_2 = -51.1053$
$\quad d_2 = 27.5000$
$r_3 = 26.3094$
$\quad d_3 = 3.0000 \quad n_2 = 1.77250 \quad \nu_2 = 49.60$
$r_4 = -26.3094$
$\quad d_4 = 27.5000$
$r_5 = 51.1053$
$\quad d_5 = 3.0000 \quad n_3 = 1.88300 \quad \nu_3 = 40.78$
$r_6 = -51.1053$
$\quad d_6 = 4.0000$
$r_7 = \infty$
$\quad d_7 = 4.0000$
$r_8 = 51.1053$
$\quad d_8 = 3.0000 \quad n_4 = 1.88300 \quad \nu_4 = 40.78$
$r_9 = -51.1053$
$\quad d_9 = 27.5000$
$r_{10} = 26.3094$
$\quad d_{10} = 3.0000 \quad n_5 = 1.77250 \quad \nu_5 = 49.60$
$r_{11} = -26.3094$
$\quad d_{11} = 27.5000$
$r_{12} = 51.1053$
$\quad d_{12} = 3.0000 \quad n_6 = 1.88300 \quad \nu_6 = 40.78$
$r_{13} = -51.1053$
$\quad d_{13} = 4.0000$
$r_{14} = \infty$
$\quad d_{14} = 4.0000$
$r_{15} = 51.1053$
$\quad d_{15} = 3.0000 \quad n_7 = 1.88300 \quad \nu_7 = 40.78$
$r_{16} = -51.1053$
$\quad d_{16} = 25.3913$
$r_{17} = 68.2570$
$\quad d_{17} = 3.0000 \quad n_8 = 1.58913 \quad \nu_8 = 61.18$
$r_{18} = -6.9277$
$\quad d_{18} = 1.0000 \quad n_9 = 1.84666 \quad \nu_9 = 23.78$
$r_{19} = -14.8299$
$\quad d_{19} = 1.0000$
$r_{20} = 14.8299$
$\quad d_{20} = 1.0000 \quad n_{10} = 1.84666 \quad \nu_{10} = 23.78$
$r_{21} = 6.9277$
$\quad d_{21} = 3.0000 \quad n_{11} = 1.58913 \quad \nu_{11} = 61.18$
$r_{22} = -68.2570$
$\quad d_{22} = 25.3913$
$r_{23} = 51.1053$
$\quad d_{23} = 3.0000 \quad n_{12} = 1.88300 \quad \nu_{12} = 40.78$ -continued Seventh Embodiment $r_{24} = -51.1053$
$\quad d_{24} = 4.0000$
$r_{25} = \infty$ paraxial lateral magnification −1, image height 2.18, NA 0.100, effective diameter of lens system 5.8, total length 217.78, entrance pupil ∞, exit pupil ∞

In the numerical data listed above, the reference symbols $r_0$ and $d_0$ represent a location of a primary image I formed by an objective lens system and a distance as measured from the image of the object I to a first surface $r_1$ of a relay lens system, as in the numerical data of the first embodiment.

In the first through seventh embodiments described above, amounts of longitudinal chromatic aberration (those in the first embodiment are the same as the values already described) are listed below:

| | Relay lens unit A | | Relay lens unit B | | Relay lens system as a whole | |
|---|---|---|---|---|---|---|
| | C-line | F-line | C-line | F-line | C-line | F-line |
| First Embodient | 0.186 | −0.417 | −0.275 | 0.787 | 0.097 | −0.047 |
| Second Embodient | 0.186 | −0.417 | −0.266 | 0.760 | 0.106 | −0.075 |
| Third Embodient | 0.186 | −0.417 | −0.248 | 0.731 | 0.124 | −0.103 |
| Fourth Embodient | 0.261 | −0.598 | −0.403 | 1.113 | 0.118 | −0.085 |
| Fifth Embodient | 0.184 | −0.412 | −0.269 | 0.782 | 0.098 | −0.042 |
| Sixth Embodient | 0.166 | −0.381 | −0.530 | 1.441 | 0.134 | −0.087 |
| Seventh Embodient | 0.239 | −0.672 | −0.442 | 1.257 | 0.143 | −0.086 |

Figure 4:
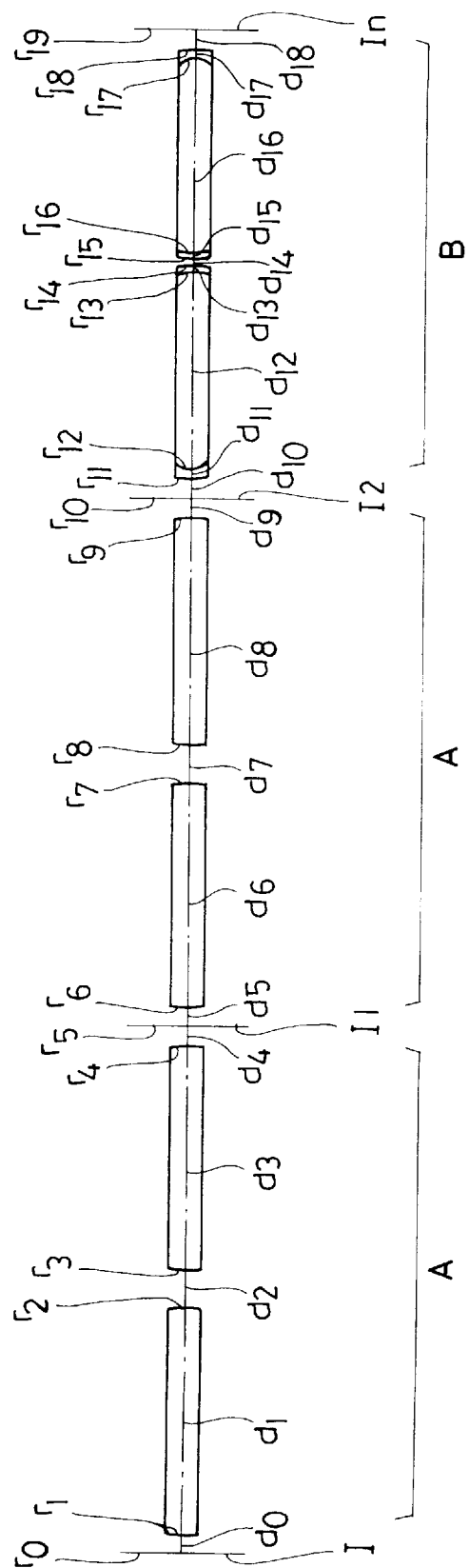

Out of the embodiments described above, a relay lens system of the second embodiment has a composition illustrated in FIG. 4. The second embodiment uses relay lens units A which are the same as those used in the first embodiment and a relay lens unit B which is different from that adopted for the first embodiment. Speaking concretely, the relay lens unit B of the second embodiment is composed of two biconvex rod-like triplet components (lens elements $r_{11} \sim r_{14}$ and lens-elements $r_{15} \sim r_{18}$). Each of these biconvex lens components consists of three lens elements: a biconvex lens element (lens element $r_{12} \sim r_{13}$ or lens element $r_{16} \sim r_{17}$) and negative meniscus lens elements cemented to both sides thereof. The negative meniscus lens elements (lens element $r_{13} \sim r_{14}$ and lens element $r_{15} \sim r_{16}$) of the two rod-like cemented triplet components which are disposed on sides of a center of the relay lens unit B contribute to correction of longitudinal chromatic aberration and spherical aberration like those used in the first embodiment, whereas the two negative meniscus lens elements (lens element $r_{11} \sim r_{12}$ and lens element $r_{17} \sim r_{18}$) which are disposed in the vicinities of the images contribute to correction of astigmatism. For correcting aberrations, each of the negative meniscus lens elements is made of a glass material which has a refractive index higher than that of a glass material selected for the biconvex lens element to which the negative meniscus lens element is cemented.

The relay lens unit A tends to undercorrect astigmatism mainly by its refracting surface disposed in the vicinity of the image. For cancelling astigmatism produced by the relay lens unit A with astigmatism having an opposite tendency, an image side cemented surface of the relay lens unit B has a negative power for producing astigmatism in an overcorrected tendency, thereby correcting astigmatism favorably in the relay lens system as a whole.

The reference symbols $r_5$, $r_{10}$ and $r_{19}$ used in the numerical data of the second embodiment represent a primary image $I_1$, a secondary image $I_2$ and a final image $I_n$, respectively.

Figure 5:
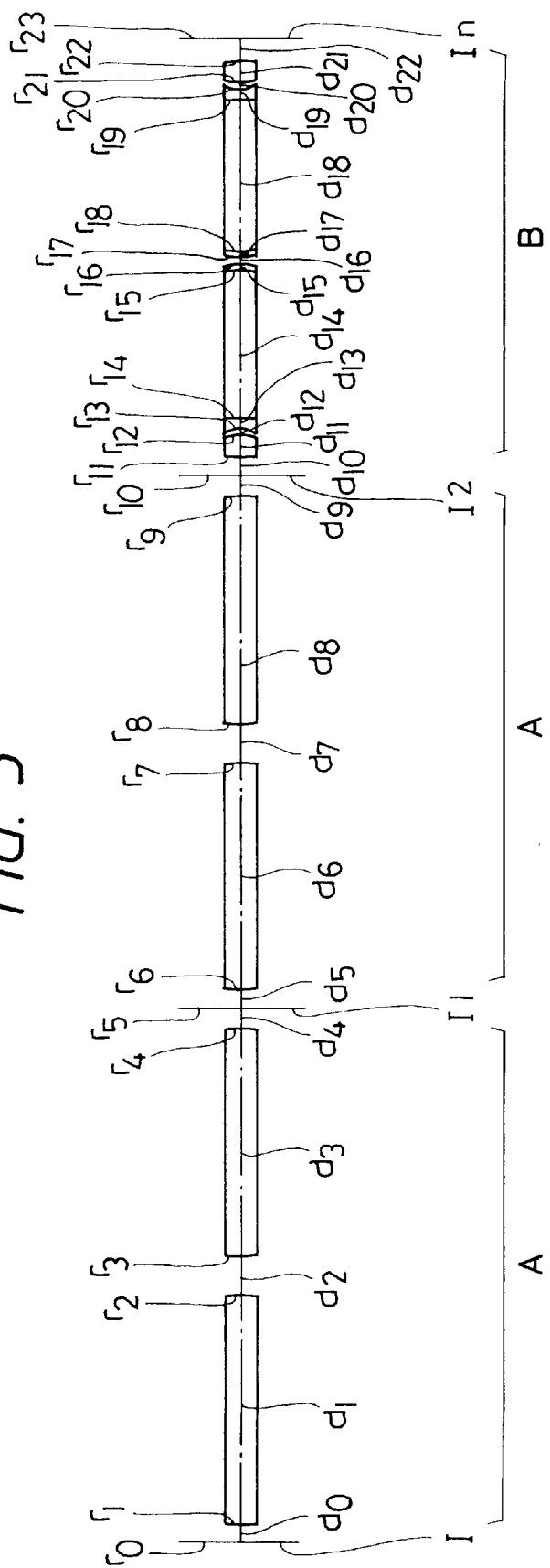

The third embodiment is characterized in that it favorably corrects astigmatism and curvature of field, and has a composition illustrated in FIG. 5. For obtaining this characteristic, a relay lens unit B is configured to correct astigmatism and curvature of field. The third embodiment uses relay lens units A, which are the same as those adopted for the first or second embodiment, and the relay lens unit B which is different from that used in the first or second embodiment. Speaking concretely, the relay lens unit B has a composition symmetrical with regard to a center thereof, or is composed, within a range from an image to the center, of a positive lens component (lens element $r_{11} \sim r_{12}$ or lens element $r_{21} \sim r_{22}$) and a rod-like cemented triplet component (lens component $r_{13} \sim r_{16}$ or lens component $r_{17} \sim r_{20}$). The rod-like cemented triplet is composed, in order from the image side, of a plano-concave lens element (lens element $r_{13} \sim r_{14}$ or lens element $r_{20} \sim r_{21}$) having a concave surface on the image side, a plano-convex rod-like lens element (lens element $r_{14} \sim r_{15}$ or lens element $r_{18} \sim r_{19}$) having a planar surface on the image side and a negative meniscus lens element ($r_{15} \sim r_{16}$ or lens element $r_{17} \sim r_{18}$).

The relay lens unit B corrects astigmatism with a bending of an air lens formed between the positive lens component disposed on the image side and the rod-like cemented triplet component. Further, curvature of field is corrected with a negative power of the plano-concave lens elements disposed in the rod-like cemented triplet components and a glass material having a low refractive index is selected for these lens elements.

Though the third embodiment uses 12 lens elements, which is not as small as the number of lens elements used for composing a relay lens system for three image relaying cycles, the third embodiment is excellent in sufficient and favorable correction of astigmatism and curvature which can hardly be corrected by the conventional relay lens systems, each of which performs three image relaying cycles with lens elements on the order of 12.

In FIG. 5, and the numerical data of the third embodiment, the reference symbols $r_5$, $r_{10}$ and $r_{23}$ represent a primary image $I_1$, a secondary image $I_2$ and a final image $I_n$, respectively.

Figure 6:
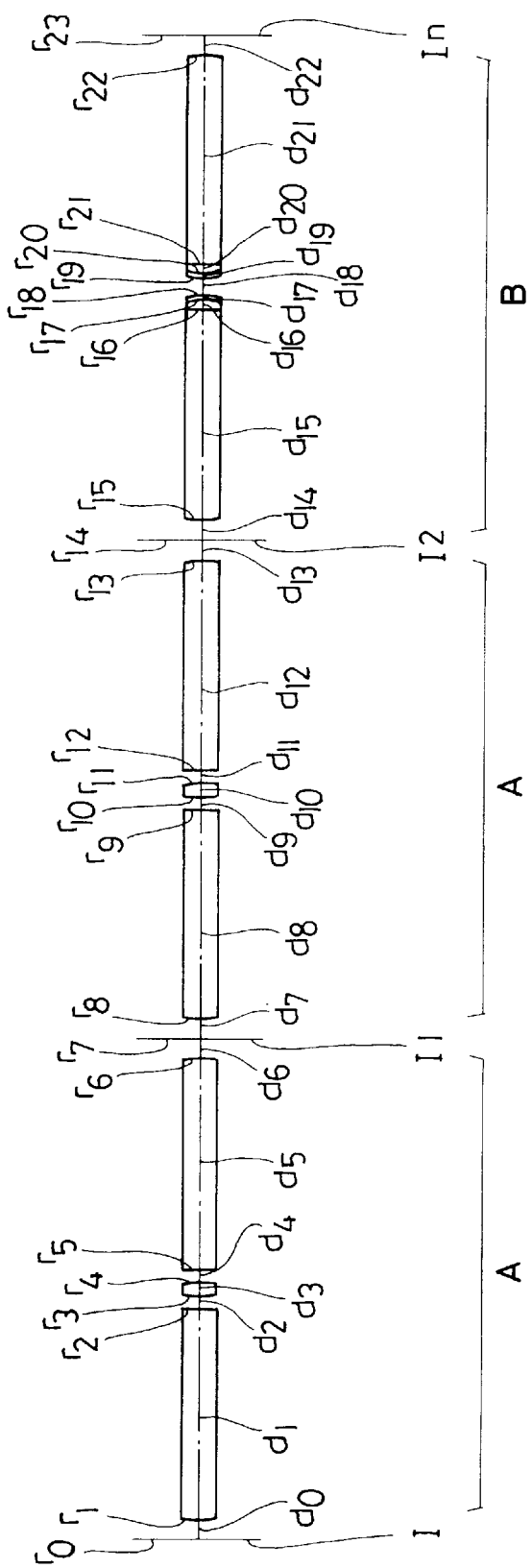

The fourth embodiment has a composition illustrated in FIG. 6, wherein rod-like lens elements have no spherical surface in the vicinities of centers of relay lens units for reducing influences due to manufacturing errors of the rod-like lens elements.

In the fourth embodiment, each of the relay lens units A is composed of two plano-convex rod-like lens components having convex surfaces on the image sides (lens element $r_1 \sim r_2$, lens element $r_5 \sim r_6$ and lens element $r_8 \sim r_9$, lens element $r_{12} \sim r_{13}$) and biconvex lens components (lens element $r_3 \sim r_4$ and lens element $r_{10} \sim r_{11}$) disposed at a center between the two plano-convex rod like lens components, or has a composition that is symmetrical with regard to a center thereof.

A rod-like lens element which has spherical surfaces poses a problem of surface eccentricities since these surfaces cannot be exactly centered at a working stage. Therefore, the fourth embodiment adopts planar surfaces on the side of the center for avoiding eccentricities of surfaces located in the vicinities of the center of the relay lens units A since eccentricities of these surfaces influence the image quality. The biconvex lens components are disposed between the rod-like lens components for making up for a positive power which is made insufficient by configuring the rod-like lens elements so as to have the plano-convex shape.

A relay lens unit B used in the fourth embodiment is of a type which is basically the same as that of the relay lens unit B used in the first embodiment, but it adopts two biconvex cemented triplet components, each of which is composed of a plano-convex rod-like lens element having a convex surface on the image side (lens element $r_{15} \sim r_{16}$ or lens element $r_{21} \sim r_{22}$), a plano-convex lens element having a planar surface on the image side (lens element $r_{16} \sim r_{17}$ or lens element $r_{20} \sim r_{21}$), and a negative meniscus lens element (lens element $r_{17} \sim r_{18}$ or lens element $r_{19} \sim r_{20}$).

The reference symbols $r_7$, $r_{14}$ and $r_{23}$ used in FIG. 6 and the numerical data represent a primary image $I_1$, a secondary image $I_2$ and a final image $I_n$, respectively.

Figure 7:
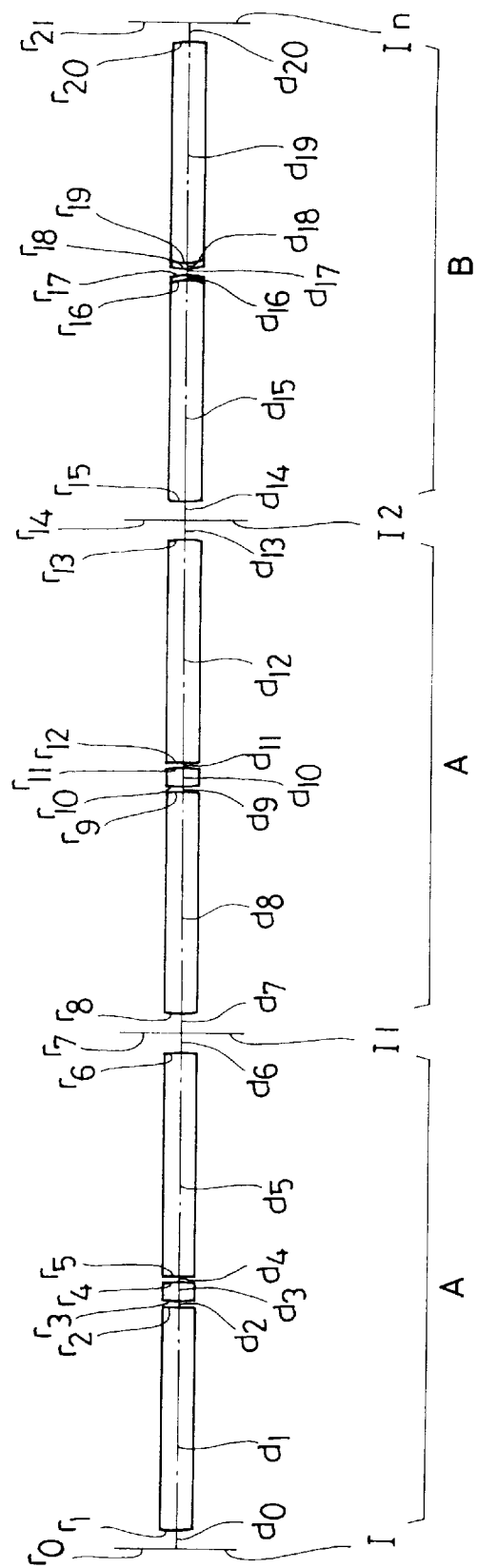

The fifth embodiment has a composition illustrated in FIG. 7 and is characterized in that it corrects spherical aberration more favorably than the other embodiments.

In the fifth embodiment, each of relay lens units A is composed of two biconvex rod-like lens elements (lens element $r_1 \sim r_2$ and lens element $r_5 \sim r_6$ or lens element $r_8 \sim r_9$ and lens element $r_{12} \sim r_{13}$), and a biconvex lens element (lens element $r_3 \sim r_4$ or lens element $r_{10} \sim r_{11}$) disposed at a center between the two rod-like lens elements. These lens elements are disposed symmetrically with regard to the center. The fifth embodiment uses a relay lens unit B which is the same as that adopted for the first embodiment.

Since the relay lens units A adopted for the fifth embodiment are not configured to correct spherical aberration by producing spherical aberration in an opposite direction, a cemented surface which has a negative power in the relay lens unit B functions to correct spherical aberration favorably in the relay lens system as a whole. If the relay lens units A allow spherical aberration to remain in a large amount, a spherical aberration curve will be remarkably curved even after cancellation of spherical aberration with the relay lens unit B. It is therefore desirable to configure the relay lens units A so as to allow spherical aberration to remain in a small amount.

For reducing an amount of spherical aberration which is allowed to remain by the relay lens units A, the fifth embodiment shares a power among four refracting surfaces disposed at the center and further reduces an amount of residual spherical aberration with bendings of air lenses formed between the two rod-like lens elements and the two convex lens elements. Accordingly, spherical aberration is corrected almost perfectly in the relay lens system as a whole.

The reference symbols $r_7$, $r_{14}$ and $r_{21}$ used in FIG. 7 and the numerical data represent a primary image $I_1$, a secondary image $I_2$ and a final image $I_n$, respectively.

Figure 8:
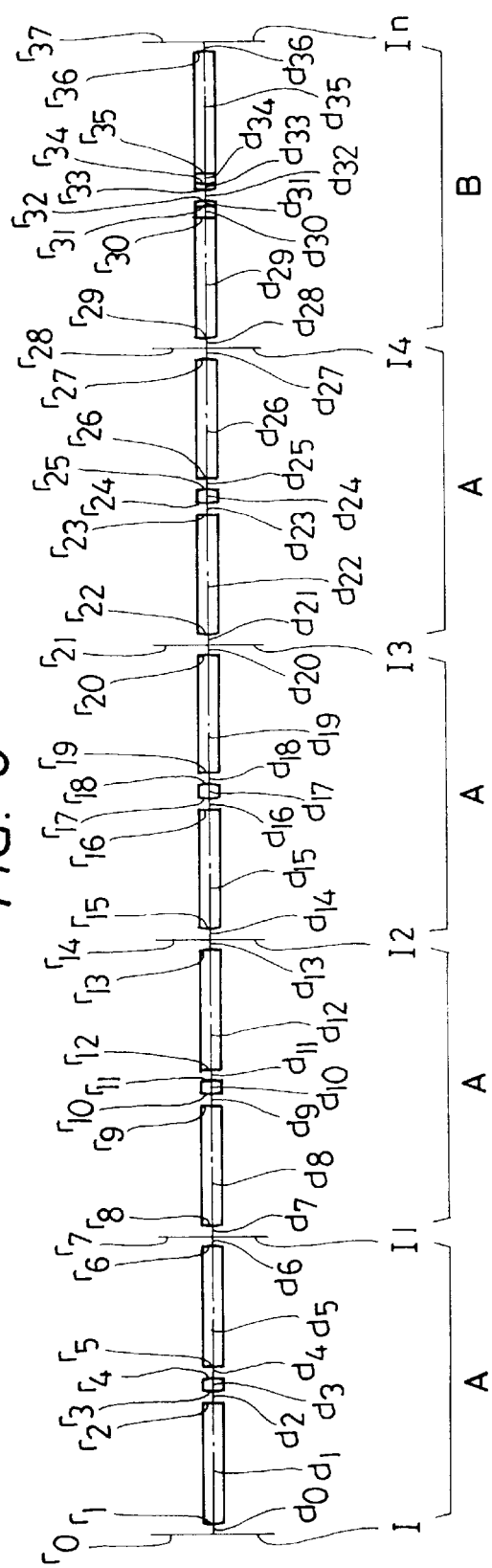

The sixth embodiment has a composition illustrated in FIG. 8. This embodiment is designed on an assumption that it is used with non-flexible endoscopes having small diameters and characterized in that it has an effective diameter smaller than that of any other embodiments.

The sixth embodiment uses relay lens units A and a relay lens unit B having compositions which are the same as those selected for the fourth embodiment, but is configured for relaying an image five times, which is larger than image relaying cycles of any other embodiment. Therefore, the relay lens unit B must cancel aberrations allowed to remain by four relay lens units A and produces aberrations in more overcorrected tendencies.

The reference symbols $r_7$, $r_{14}$, $r_{21}$, $r_{28}$ and $r_{37}$ used in FIG. 8 and the numerical data represent a primary image $I_1$, a secondary image $I_2$, a tertiaquaternary $I_3$, a quaternary image $I_4$ and a final image $I_n$, respectively.

Figure 9:
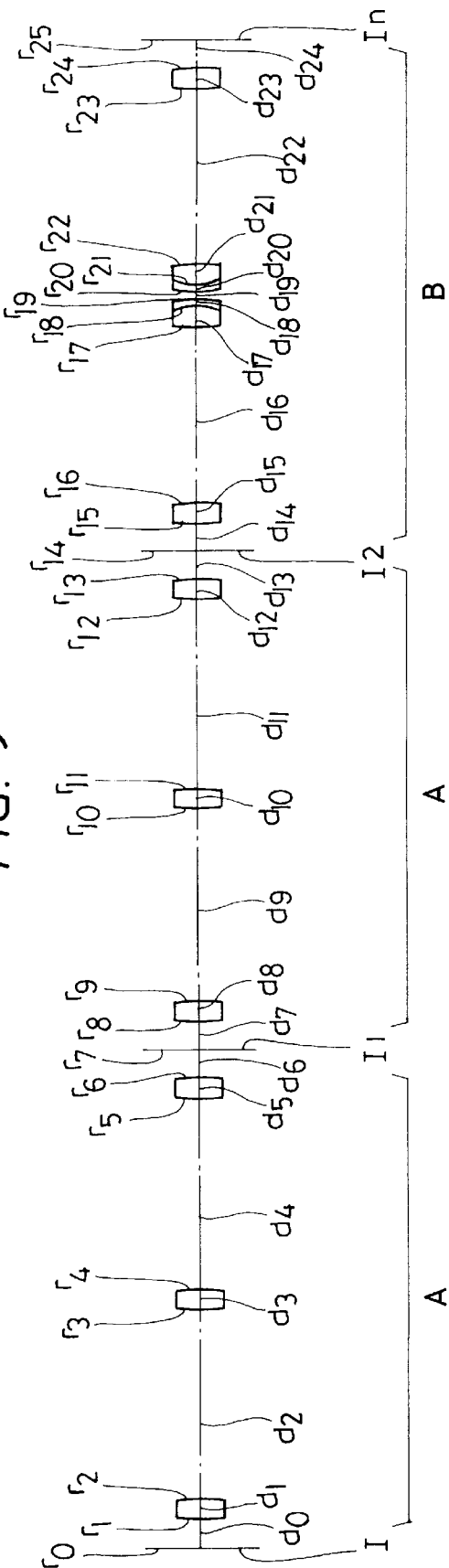

The seventh embodiment has a composition shown in FIG. 9 and is characterized in that it composes a relay lens system using no rod-like lens element.

An N.A. (numerical aperture) of a relay lens system can be enlarged and brightness of the lens system can be improved by using rod-like lens elements. However, rod-like lens elements may degrade image qualities due to manufacturing errors or eccentricities of surfaces thereof. Further, rod-like lens elements pose a problem of image coloring which is caused by internal absorption from the glass materials thereof. A relay lens system can be composed without using rod-like lens elements dependently on specifications of non-flexible endoscopes to be used therewith.

In the seventh embodiment, each of relay lens units A is composed of positive field lens components disposed in the vicinities of front and rear images (lens element $r_1$~$r_2$ and lens element $r_5$~$r_6$ or lens element $r_8$~$r_9$ and lens element $r_{12}$~$r_{13}$) and a biconvex lens component disposed in the vicinity of a center (lens element $r_3$~$r_4$ or lens element $r_{10}$~$r_{11}$). These lens components are disposed symmetrically with regard to the center. Further, a relay lens unit B is composed of positive field lens components disposed in the vicinities of the front and rear images (lens element $r_{15}$~$r_{16}$ and lens element $r_{23}$~$r_{24}$) and positive cemented lens components disposed in the vicinities of a center (lens component $r_{17}$~$r_{19}$ and lens component $r_{20}$~$r_{22}$). These lens components are arranged symmetrically with regard to the center.

The reference symbols $r_7$, $r_{14}$ and $r_{25}$ used in FIG. 9 and the numerical data represent a primary image $I_1$, a secondary image $I_2$ and a final image $I_n$ respectively.

It is desirable that the relay lens system according to the present invention uses the relay lens units B in a number smaller than that of the relay lens units A.

Though the relay lens unit A can be composed of a small number of lens elements for simplifying a composition thereof, the relay lens unit B is inevitably composed of a large number of lens element since it bears a burden for correcting aberrations. Since the relay lens unit A is composed of lens elements in a number larger than that of lens elements disposed in the relay lens unit B as described above, it is desirable, for composing a relay lens system of a small number of lens elements, to use the relay lens units A in a number larger than that of the relay lens units B.

For the relay lens unit A to be disposed in the relay lens system according to the present invention, it is desirable to select one of the compositions listed below dependently on specifications of non-flexible endoscope to be used therewith:

(1) The relay lens unit is composed of two biconvex rod-like lens elements which are disposed symmetrically with regard to a center of the relay lens unit (as shown in FIG. 3, for example).

(2) The relay lens unit is composed of two plano-convex rod-like lens elements having convex surfaces on the sides of images and biconvex lens elements disposed between the plano-convex rod-like lens elements; these lens elements being disposed symmetrically with regard to a center of the relay lens unit (as shown in FIG. 6, for example).

(3) The relay lens unit is composed of two biconvex rod-like lens elements and biconvex lens elements disposed between the biconvex rod-like lens elements; these lens elements being disposed symmetrically with regard to a center of the relay lens unit (as shown in FIG. 7, for example).

(4) The relay lens unit is composed of positive field lens elements disposed in the vicinities of front and rear images, respectively, and biconvex lens elements disposed in the vicinities of a center of the relay lens unit; these lens elements being disposed symmetrically with regard to a center of the relay lens unit (as shown in FIG. 9, for example).

The terms biconvex rod-like lens elements and plano-convex rod-like lens element mean not only rod-like lens elements but also cemented lens components which have cemented surfaces such as those shown in FIGS. 11A, 11B and 11C. FIG. 11A shows a cemented triplet which consists of a rod-like lens element having planar surfaces on both sides and plano-convex lens elements cemented thereto. FIG. 11B shows a biconvex rod-like cemented doublet which consists of a plano-convex rod-like lens element and a plano-convex lens element cemented to the planar surface of the plano-convex rod-like lens element. FIG. 11C shows a plano-convex rod-like cemented doublet which consists of a rod-like lens element having planar surfaces on both sides and a plano-convex lens element cemented to a side surface of the rod-like lens element. The problem of surface eccentricities due to manufacturing errors which are caused by selecting convex end surfaces for the rod-like lens elements can be solved by selecting the compositions shown in FIGS. 11A, 11B and 11C. Further, it is desirable for correcting aberrations produced by transmittance and convex surfaces of the rod-like lens elements to select glass materials having high transmittance for the rod-like lens elements and use glass materials having high refractive indices for the plano-convex lens elements.

Further, it is desirable that the relay lens unit B comprises at least two negative lens elements which have an Abbe's number not exceeding 40 and are disposed in the vicinities of a center of the lens unit. Since the relay lens unit B must produce longitudinal chromatic aberration in an excessive amount, it must comprise, in the vicinity thereof, a negative lens element which produces longitudinal chromatic aberration in a large amount. Needless to say, this negative lens element has a strong dispersing power and an Abbe's number smaller than a certain level. Further, it is necessary to use at least two negative lens elements since only an insufficient amount of longitudinal chromatic aberration can be corrected with a single negative lens element.

Furthermore, no restriction is imposed on disposing orders of the relay lens units A and the relay lens unit B. Though the relay lens unit B is disposed on a side of a final image formed by the relay lens system in each of the embodiments described above, no difference is produced in optical performance of the relay lens system by disposing the relay lens unit B on the side of the objective lens system or between the relay lens units A as shown in FIG. 12A or FIG. 12B. A plurality of relay lens units B may be disposed in a relay lens system as shown in FIG. 12C.

In the drawings, the reference symbols A and B represent the relay lens unit A and the relay lens unit B.

The relay lens system for non-flexible endoscopes according to the present invention is usable with a variety of non-flexible endoscopes, can be manufactured at a low cost and has sufficiently corrected longitudinal chromatic aberration.

I claim:

1. An observation optical system for non-flexible endoscopes which is to be disposed in an elongated insert section of a non-flexible endoscope having said insert section, comprising:

an objective lens system; and a relay lens system, wherein said relay lens system comprises a plurality of relay lens units, at least one relay lens unit of said plurality of relay lens units produces undercorrected longitudinal chromatic aberration and at least another relay lens unit of said plurality of relay lens units produces overcorrected longitudinal chromatic aberration, and wherein longitudinal chromatic aberration is corrected in said observation optical system as a whole by cancelling said undercorrected longitudinal chromatic aberration with said overcorrected longitudinal chromatic aberration, wherein said relay lens system comprises no gradient index lens element, wherein said at least one relay lens unit which produces undercorrected longitudinal chromatic aberration comprises no negative lens element, and wherein said at least another relay lens unit which produces overcorrected longitudinal chromatic aberration comprises negative lens elements, wherein said at least one relay lens unit which comprises no negative lens element is composed of two biconvex rod-like lens components and biconvex lens components disposed between said biconvex rod-like lens components, said lens components of said at least one relay lens unit being disposed symmetrically on both front and rear sides of a center of said at least one relay lens unit.

2. An observation optical system for non-flexible endoscopes which is to be disposed in an elongated insert section of a non-flexible endoscope having said insert section, comprising:

an objective lens system; and a relay lens system, wherein said relay lens system comprises a plurality of relay lens units, at least one relay lens unit of said plurality of relay lens units produces undercorrected longitudinal chromatic aberration and at least another relay lens unit of said plurality of relay lens units produces overcorrected longitudinal chromatic aberration, and wherein longitudinal chromatic aberration is corrected in said observation optical system as a whole by cancelling said undercorrected longitudinal chromatic aberration with said overcorrected longitudinal chromatic aberration, wherein said relay lens system comprises no gradient index lens element, wherein said at least one relay lens unit which produces undercorrected longitudinal chromatic aberration comprises no negative lens element, and wherein said at least another relay lens unit which produces overcorrected longitudinal chromatic aberration comprises negative lens elements, wherein said at least one relay lens unit which comprises no negative lens element is composed of positive field lens components which are disposed in the vicinities of images formed on the front side and the rear side respectively of said relay lens unit, and biconvex lens components disposed in the vicinities of a center of said relay lens unit, said lens components of said at least one relay lens unit being disposed symmetrically with regard to a center of said at least one relay lens unit.

3. An observation optical system for non-flexible endoscopes according to claim 1 or 2, wherein said at least another relay lens unit which comprises negative lens elements is composed of two rod-like cemented lens components consisting of biconvex rod-like lens elements and negative lens elements, and said lens components of said at least another relay lens unit are disposed symmetrically with regard to the center of said at least another relay lens unit in such a direction as to arrange said negative lens elements opposing each other.

4. An observation optical system for non-flexible endoscopes according to claim 1 or 2, wherein said at least another relay lens unit which comprises negative lens elements is composed of two rod-like cemented lens components consisting of biconvex lens elements and negative lens elements disposed on both sides of each rod-like lens element, said lens elements of said at least another relay lens unit being disposed symmetrically with regard to a center of said at least another relay lens unit.

5. An observation optical system for non-flexible endoscopes according to claim 1 or 2, wherein said at least another relay lens unit which comprises negative lens elements is composed of a positive lens component, a rod-like cemented lens component consisting of a rod-like lens element and negative lens elements disposed on both sides thereof, a rod-like cemented lens component consisting of a rod-like lens element and negative lens elements disposed on both sides thereof, and a positive lens component, said lens components of said at least another relay lens unit being disposed symmetrically with regard to a center of said at least another relay lens unit.

6. An observation optical system for non-flexible endoscopes according to claim 1 or 2, wherein said at least another relay lens unit which comprises negative lens elements is composed of two rod-like cemented lens components consisting of biconvex rod-like lens elements, positive lens elements and negative lens elements, said lens elements of said at least another relay lens unit being disposed symmetrically with regard to a center of said relay lens unit.

7. An observation optical system for non-flexible endoscopes according to claim 1 or 2, wherein said at least another relay lens unit which comprises negative lens elements is composed of a field lens component, a cemented lens component, a cemented lens component and a field lens component, said lens components being disposed symmetrically with regard to a center of said at least another relay lens unit.

8. An observation optical system for non-flexible endoscopes according to claim 1, wherein said at least another relay lens unit which comprises negative lens elements comprises, in the vicinities of the center of said relay lens unit, at least two negative lens elements made of a glass material having an Abbe's number not exceeding 40.

9. An observation optical system for non-flexible endoscopes according to claim 1 or 2, wherein said at least one relay lens unit which comprises no negative lens element comprises an optical element having no power.

10. An observation optical system for non-flexible endoscopes which is to be disposed in an elongated insert section of a non-flexible endoscope having said insert section, comprising:

an objective lens system; and a relay lens system, wherein said relay lens system comprises a plurality of relay lens units, at least one relay lens unit of said plurality of relay lens units produces undercorrected longitudinal chromatic aberration and at least another relay lens unit of said plurality of relay lens units produces overcorrected longitudinal chromatic aberration, wherein longitudinal chromatic aberration is corrected in said observation optical system as a whole by cancelling said undercorrected longitudinal chromatic aberration with said overcorrected longitudinal chromatic aberration, wherein said relay lens system comprises no gradient index lens element, wherein said at least one relay lens unit which produces undercorrected longitudinal chromatic aberration comprises no negative lens element, wherein said at least another relay lens unit which produces overcorrected longitudinal chromatic aberration comprises negative lens elements, wherein said at least one relay lens unit which comprises no negative lens element is composed of two plano-convex rod-like lens components having convex surfaces on sides of the images and biconvex lens components disposed between said plano-convex rod-like lens components, said lens components of said at least one relay lens unit being disposed symmetrically on both front and rear sides of a center of said at least one relay lens unit, and wherein said at least another relay lens unit which comprises negative lens elements comprises, in the vicinities of the center of said relay lens unit, at least two negative lens elements made of a glass material having an Abbe's number not exceeding 40.

11. An observation optical system for non-flexible endoscopes which is to be disposed in an elongated insert section of a non-flexible endoscope having said insert section, comprising:

an objective lens system; and a relay lens system, wherein said relay lens system comprises a plurality of relay lens units, at least one relay lens unit of said plurality of relay lens units produces undercorrected longitudinal chromatic aberration and at least another relay lens unit of said plurality of relay lens units produces overcorrected longitudinal chromatic aberration, wherein longitudinal chromatic aberration is corrected in said observation optical system as a whole by cancelling said undercorrected longitudinal chromatic aberration with said overcorrected longitudinal chromatic aberration, wherein said relay lens system comprises no gradient index lens element, wherein said at least one relay lens unit which produces undercorrected longitudinal chromatic aberration comprises no negative lens element, wherein said at least another relay lens unit which produces overcorrected longitudinal chromatic aberration comprises negative lens elements, wherein said at least another relay lens unit which comprises negative lens elements is composed of two rod-like cemented lens components consisting of biconvex rod-like lens elements and negative lens elements, and said lens components of said at least another relay lens unit are disposed symmetrically with regard to the center of said at least another relay lens unit in such a direction as to arrange said negative lens elements opposing each other.

12. An observation optical system for non-flexible endoscopes which is to be disposed in an elongated insert section of a non-flexible endoscope having said insert section, comprising:

an objective lens system; and a relay lens system, wherein said relay lens system comprises a plurality of relay lens units, at least one relay lens unit of said plurality of relay lens units produces undercorrected longitudinal chromatic aberration and at least another relay lens unit of said plurality of relay lens units produces overcorrected longitudinal chromatic aberration, wherein longitudinal chromatic aberration is corrected in said observation optical system as a whole by cancelling said undercorrected longitudinal chromatic aberration with said overcorrected longitudinal chromatic aberration, wherein said relay lens system comprises no gradient index lens element, wherein said at least one relay lens unit which produces undercorrected longitudinal chromatic aberration comprises no negative lens element, wherein said at least another relay lens unit which produces overcorrected longitudinal chromatic aberration comprises negative lens elements, and wherein said at least another relay lens unit which comprises negative lens elements is composed of two rod-like cemented lens components consisting of biconvex lens elements and negative lens elements disposed on both sides of each rod-like lens element, said lens elements of said at least another relay lens unit being disposed symmetrically with regard to a center of said at least another relay lens unit.

13. An observation optical system for non-flexible endoscopes which is to be disposed in an elongated insert section of a non-flexible endoscope having said insert section, comprising:

an objective lens system; and a relay lens system, wherein said relay lens system comprises a plurality of relay lens units, at least one relay lens unit of said plurality of relay lens units produces undercorrected longitudinal chromatic aberration and at least another relay lens unit of said plurality of relay lens units produces overcorrected longitudinal chromatic aberration, wherein longitudinal chromatic aberration is corrected in said observation optical system as a whole by cancelling said undercorrected longitudinal chromatic aberration with said overcorrected longitudinal chromatic aberration, wherein said relay lens system comprises no gradient index lens element, wherein said at least one relay lens unit which produces undercorrected longitudinal chromatic aberration comprises no negative lens element, wherein said at least another relay lens unit which produces overcorrected longitudinal chromatic aberration comprises negative lens elements, and wherein said at least another relay lens unit which comprises negative lens elements is composed of a positive lens component, a rod-like cemented lens component consisting of a rod-like lens element and negative lens elements disposed on both sides thereof, a rod-like cemented lens component consisting of a rod-like lens element and negative lens elements disposed on both sides thereof, and a positive lens component, said lens components of said at least another relay lens unit being disposed symmetrically with regard to a center of said at least another relay lens unit.

14. An observation optical system for non-flexible endoscopes which is to be disposed in an elongated insert section of a non-flexible endoscope having said insert section, comprising:

an objective lens system; and a relay lens system, wherein said relay lens system comprises a plurality of relay lens units, at least one relay lens unit of said plurality of relay lens units produces undercorrected longitudinal chromatic aberration and at least another relay lens unit of said plurality of relay lens units produces overcorrected longitudinal chromatic aberration, wherein longitudinal chromatic aberration is corrected in said observation optical system as a whole by cancelling said undercorrected longitudinal chromatic aberration with said overcorrected longitudinal chromatic aberration, wherein said relay lens system comprises no gradient index lens element, wherein said at least one relay lens unit which produces undercorrected longitudinal chromatic aberration comprises no negative lens element, wherein said at least another relay lens unit which produces overcorrected longitudinal chromatic aberration comprises negative lens elements, and wherein said at least another relay lens unit which comprises negative lens elements is composed of two rod-like cemented lens components consisting of biconvex rod-like lens elements, positive lens elements and negative lens elements, said lens elements of said at least another relay lens unit being disposed symmetrically with regard to a center of said relay lens unit.

15. An observation optical system for non-flexible endoscopes which is to be disposed in an elongated insert section of a non-flexible endoscope having said insert section, comprising:

an objective lens system; and a relay lens system, wherein said relay lens system comprises a plurality of relay lens units, at least one relay lens unit of said plurality of relay lens units produces undercorrected longitudinal chromatic aberration and at least another relay lens unit of said plurality of relay lens units produces overcorrected longitudinal chromatic aberration, wherein longitudinal chromatic aberration is corrected in said observation optical system as a whole by cancelling said undercorrected longitudinal chromatic aberration with said overcorrected longitudinal chromatic aberration, wherein said relay lens system comprises no gradient index lens element, wherein said at least one relay lens unit which produces undercorrected longitudinal chromatic aberration comprises no negative lens element, wherein said at least another relay lens unit which produces overcorrected longitudinal chromatic aberration comprises negative lens elements, and wherein said at least another relay lens unit which comprises negative lens elements is composed of a field lens component, a cemented lens component, a cemented lens component and a field lens component, said lens components being disposed symmetrically with regard to a center of said at least another relay lens unit.

16. An observation optical system for non-flexible endoscopes according to claim 11, 12, 13, 14 or 15, wherein a number of relay lens units of said plurality of relay lens units which comprise negative lens elements is less than a number of relay lens units of said plurality of relay lens units which comprise no negative lens elements.

17. An observation optical system for non-flexible endoscopes according to claim 11, 12, 13, 14 or 15, wherein said at least one relay lens unit which comprises no negative lens element is composed of two rod-like lens components which are disposed symmetrically on both front and rear sides of a center of said at least one relay lens unit.

18. An observation optical system for non-flexible endoscopes according to claim 11, 12, 13, 14 or 15, wherein said at least one relay lens unit which comprises no negative lens element is composed of two piano-convex rod-like lens components having convex surfaces on sides of the images and biconvex lens components disposed between said plano-convex rod-like lens components, said lens components of said at least one relay lens unit being disposed symmetrically on both front and rear sides of a center of said at least one relay lens unit.

* * * * *